United States Patent
Liu et al.

(10) Patent No.: US 9,215,715 B2
(45) Date of Patent: Dec. 15, 2015

(54) DYNAMIC SPECTRUM ALLOCATION METHOD, CENTRAL CONTROL UNIT, BASE STATION AND SPECTRUM ALLOCATION SYSTEM

(71) Applicant: Huawei Technologies Co., Ltd., Shenzhen, Guangdong (CN)

(72) Inventors: Jinnan Liu, Shenzhen (CN); Shulan Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 14/108,151

(22) Filed: Dec. 16, 2013

(65) Prior Publication Data

US 2014/0120975 A1    May 1, 2014

Related U.S. Application Data

(63) Continuation of application No. PCT/CN2011/075807, filed on Jun. 16, 2011.

(51) Int. Cl.
| | |
|---|---|
| *H04B 7/00* | (2006.01) |
| *H04B 15/00* | (2006.01) |
| *H04W 72/00* | (2009.01) |
| *H04W 72/04* | (2009.01) |
| *H04W 16/10* | (2009.01) |
| *H04W 16/14* | (2009.01) |

(52) U.S. Cl.
CPC .......... *H04W 72/0493* (2013.01); *H04W 16/10* (2013.01); *H04W 16/14* (2013.01)

(58) Field of Classification Search
CPC .................................................. H04W 72/04

USPC ............................................ 455/509, 507, 501
See application file for complete search history.

(56) References Cited

U.S. PATENT DOCUMENTS

| | | | |
|---|---|---|---|
| 8,948,771 B2 * | 2/2015 | Koskela et al. ............ 455/452.1 |
| 8,995,331 B2 * | 3/2015 | Kazmi et al. .................. 370/315 |
| 2007/0026868 A1 * | 2/2007 | Schulz et al. ................. 455/454 |
| 2008/0108365 A1 | 5/2008 | Buddhikot et al. |
| 2008/0220787 A1 | 9/2008 | Stanwood et al. |
| 2012/0063373 A1 * | 3/2012 | Chincholi et al. ............ 370/281 |
| 2012/0071188 A1 | 3/2012 | Wang et al. |
| 2012/0134328 A1 * | 5/2012 | Gauvreau et al. ............. 370/329 |

(Continued)

FOREIGN PATENT DOCUMENTS

| | | |
|---|---|---|
| CN | 1937824 A | 3/2007 |
| CN | 101860914 A | 10/2010 |

(Continued)

OTHER PUBLICATIONS

Chen et al., "Aggregation Aware Spectrum Assignment in Cognitive Ad-hoc Networks," *Cognitive Radio Oriented Wireless Networks and Communications*, 3rd *International Conference on*, IEEE, New York, New York (May 2008).

*Primary Examiner* — Tilahun B Gesesse
(74) *Attorney, Agent, or Firm* — Leydig, Voit & Mayer, Ltd.

(57) ABSTRACT

A dynamic spectrum allocation method, a central control unit, a base station, and a spectrum allocation system are disclosed. The embodiments of the present invention further disclose a central control unit, a base station, and a spectrum allocation system to reduce the probability of failure of the spectrum allocation scheme.

8 Claims, 9 Drawing Sheets

(56) References Cited

U.S. PATENT DOCUMENTS

| | | |
|---|---|---|
| 2012/0250631 A1* | 10/2012 | Hakola et al. ............... 370/329 |
| 2012/0264440 A1* | 10/2012 | Koskela et al. ............. 455/450 |
| 2013/0188552 A1* | 7/2013 | Kazmi et al. ................ 370/315 |
| 2013/0295948 A1* | 11/2013 | Ye et al. ................... 455/452.1 |
| 2013/0336156 A1* | 12/2013 | Wei et al. ................... 370/252 |
| 2014/0113612 A1* | 4/2014 | Shu ............................. 455/418 |
| 2014/0120975 A1* | 5/2014 | Liu et al. .................... 455/509 |
| 2014/0140314 A1* | 5/2014 | Wei et al. .................... 370/329 |
| 2015/0043520 A1* | 2/2015 | Sun et al. .................... 370/330 |
| 2015/0049712 A1* | 2/2015 | Chen et al. ................... 370/329 |
| 2015/0103715 A1* | 4/2015 | Chen et al. ................... 370/311 |
| 2015/0103777 A1* | 4/2015 | Chen et al. ................... 370/329 |
| 2015/0105090 A1* | 4/2015 | Koskela et al. ............. 455/452.1 |
| 2015/0181589 A1* | 6/2015 | Luo et al. |

FOREIGN PATENT DOCUMENTS

| | | |
|---|---|---|
| CN | 101909302 A | 12/2010 |
| EP | 1863303 A1 | 12/2007 |
| WO | WO 2007018697 A1 | 2/2007 |
| WO | WO 2010117555 A2 | 10/2010 |

* cited by examiner

US 9,215,715 B2

DYNAMIC SPECTRUM ALLOCATION METHOD, CENTRAL CONTROL UNIT, BASE STATION AND SPECTRUM ALLOCATION SYSTEM

CROSS-REFERENCE TO RELATED APPLICATIONS

This application is a continuation of International Patent Application No. PCT/CN2011/075807, filed on Jun. 16, 2011, which is hereby incorporated by reference in its entirety.

TECHNICAL FIELD

Embodiments of the present invention relate to the field of radio communications technologies, and in particular, to a dynamic spectrum allocation method, a central control unit, a base station, and a spectrum allocation system.

BACKGROUND

The cognitive radio technology is a technology allowing radio communication equipment to use an idle spectrum to perform radio communication without interfering with authorized users in the same band. Nowadays, with spectrum resources being increasingly scarce, cognitive radio is widely spotlighted and researched as a method of improving spectrum utilization. As one of core technologies of cognitive radio, the dynamic spectrum allocation technology becomes a research focus.

In the prior art, from the perspective of network architecture, the dynamic spectrum allocation technology may be based on central control or may be distributed. In the dynamic spectrum allocation based on central control, a central control unit in a network is designed to manage resources of unauthorized bands aggregately, where the unauthorized bands include open bands and open authorized bands. Open bands refer to spectrum resources available to low-power devices (with power lower than 1 w) without authorization, such as industrial scientific medical (ISM, Industrial Scientific Medical) bands, without interfering with devices of other bands; open authorized bands refer to spectrum resources in an authorized band, which are allowed to be used by a device in an unauthorized way without interfering with authorized users, such as television white space (TV WS, Television White Space) band; and authorized bands refer to bands that are not available without a license.

Specifically, the dynamic spectrum allocation method based on central control includes the following steps:

1. A central control unit receives a bandwidth request message sent by a base station, where the request message includes a bandwidth requirement of the base station, transmit power of the base station, and geographic location information of the base station.

2. The central control unit determines current unauthorized idle spectrum resources of the base station according to the transmit power and geographic location information of the base station carried in the bandwidth request message, and determines a spectrum allocation scheme for the base station according to the bandwidth requirement of the base station.

3. If the current idle spectrum resources can meet the bandwidth requirement of the base station, the central control unit sends a bandwidth request response message including the spectrum allocation scheme to the base station.

4. The central control unit receives a bandwidth request confirmation message sent by the base station, and confirms actually used unauthorized band resources.

5. The central control unit updates information on occupation of the unauthorized band according to the received bandwidth request confirmation message.

However, the spectrum allocation scheme determined in the foregoing method may go beyond the radio frequency capabilities of the base station, and the base station may be unable to use unauthorized bands as indicated by the spectrum allocation scheme, which leads to failure of a spectrum allocation algorithm.

SUMMARY

Embodiments of the present invention provide a dynamic spectrum allocation method, a central control unit, a base station, and a spectrum allocation system to allocate a spectrum dynamically according to a bandwidth requirement of the base station and improve spectrum allocation flexibility and spectrum resource utilization effectively.

A dynamic spectrum allocation method according to an embodiment of the present invention includes: receiving a bandwidth request message sent by a base station, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station; determining a spectrum allocation scheme according to the radio frequency capabilities of the base station, the bandwidth requirement on the unauthorized bands of the base station, the set of authorized bands of the base station, and an obtained set of unauthorized bands that are currently idle; and sending a bandwidth request response message including the spectrum allocation scheme, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

A dynamic spectrum allocation method according to an embodiment of the present invention includes: sending a bandwidth request message to a central control unit, where the bandwidth request message includes radio frequency capabilities of the base station, a bandwidth requirement on unauthorized bands of the base station, and a set of authorized bands of the base station, where the set of authorized bands of the base station includes at least of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station; receiving a bandwidth request response message including a spectrum allocation scheme from the central control unit, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station; and using the unauthorized band allocated to the base station and dealing with the bandwidth requirement on at least one authorized band according to the spectrum allocation scheme.

A central control unit according to an embodiment of the present invention includes: a receiver, configured to receive a bandwidth request message sent by a base station, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station; a scheme formulating unit, configured to determine a spectrum allocation scheme according to the radio frequency capabilities of the base station, the bandwidth requirement on the unauthorized bands of the base station, the set of authorized bands of the base station, and an obtained set of unauthorized bands that are currently idle; and a sender, configured to send a bandwidth request response message including the spectrum allocation scheme, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

A base station according to an embodiment of the present invention includes: a sender, configured to send a bandwidth request message to a central control unit, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station; a receiver, configured to receive a bandwidth request response message including a spectrum allocation scheme from the central control unit, where the spectrum allocation scheme is used to indicate an unauthorized band allocated to the base station, and indicate the need of aggregating a bandwidth requirement on at least one authorized band in the set of authorized bands of the base station to the unauthorized band allocated to the base station; and a using unit, configured to use the unauthorized band allocated to the base station and deal with the bandwidth requirement on at least one authorized band according to the spectrum allocation scheme.

A spectrum allocation system according to an embodiment of the present invention includes a central control unit and a base station.

As revealed in the foregoing technical solutions, the embodiments of the present invention have the following advantages:

In the embodiments of the present invention, a central control unit determines a spectrum allocation scheme according to radio frequency capabilities of a base station, a bandwidth requirement on authorized bands of the base station, and a set of authorized bands of the base station, which are included in a received bandwidth request message, and according to an obtained set of unauthorized bands that are currently idle. By aggregating the bandwidth requirement on the authorized bands of the base station to an unauthorized band allocated to the base station, the spectrum allocation scheme that is fit for the radio frequency capabilities of the base station is obtained, thereby reducing the probability of failure of the spectrum allocation scheme, reducing the number of radio frequency chains required, saving radio frequency resources, and implementing dynamic spectrum allocation.

DESCRIPTION OF EMBODIMENTS

Embodiments of the present invention provide a dynamic spectrum allocation method, a central control unit, a base station, and a spectrum allocation system, where the central control unit performs dynamic spectrum allocation for the base station, so as to reduce the probability of failure of a spectrum allocation scheme, reduce the number of radio frequency chains required by the base station, and improve system flexibility.

Figure 1:
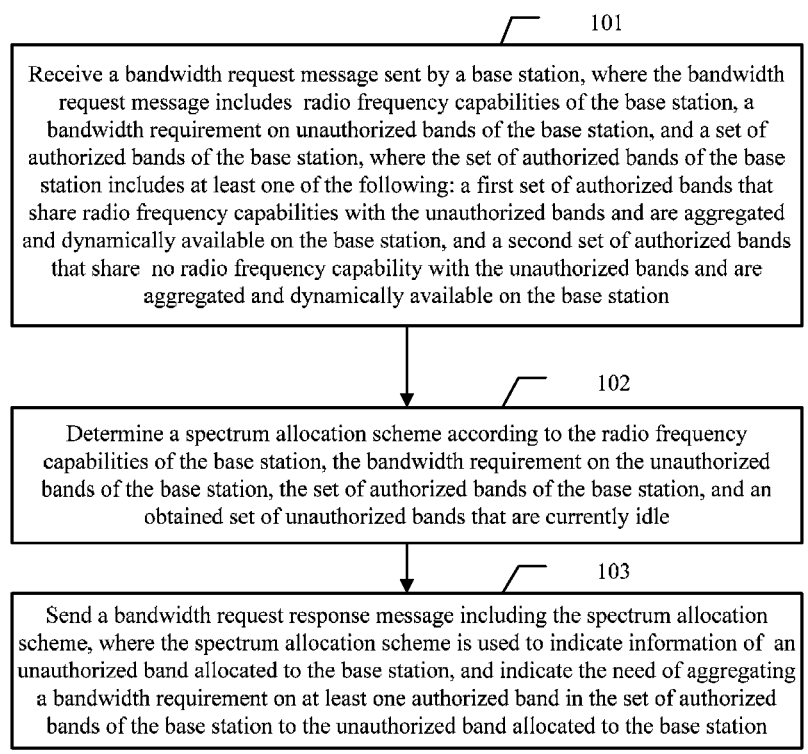
FIG. 1 is a schematic diagram of a dynamic spectrum allocation method according to an embodiment of the present invention.

Referring to FIG. 1, a dynamic spectrum allocation method is provided according to an embodiment of the present invention, including the following steps:

101. Receive a bandwidth request message sent by a base station, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station.

A central control unit manages resources of unauthorized bands, and performs dynamic spectrum allocation according to the bandwidth request of the base station. In the embodiment of the present invention, the central control unit receives a bandwidth request message sent by the base station, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station. Further, the bandwidth request message includes the transmit power of the base station, geographic location information of the base station, and a base station system version identifier.

The sharing of a radio frequency capability between an authorized band and an unauthorized band means that both the authorized band and the unauthorized band fall within a band range supported by a radio frequency chain, and resources of the radio frequency chain are occupied no matter whether the authorized band is in use or the unauthorized band is in use; the sharing of no radio frequency capability between an authorized band and an unauthorized band means that the authorized band and the unauthorized band fall within spectrum ranges supported by two separate radio frequency chains, respectively, and their respective radio frequency chains are used to support corresponding bands.

102. Determine a spectrum allocation scheme according to the radio frequency capabilities of the base station, the bandwidth requirement on the unauthorized bands of the base station, the set of authorized bands of the base station, and an obtained set of unauthorized bands that are currently idle.

After receiving the bandwidth request message of the base station, the central control unit determines a spectrum allocation scheme according to the radio frequency capabilities of the base station, the bandwidth requirement on the unauthorized bands of the base station, the set of authorized bands of the base station, and the obtained set of unauthorized bands that are currently idle.

In the embodiment of the present invention, the central control unit may create an interference diagram according to the transmit power of the base station and the geographic location information of the base station which are carried in the bandwidth request message. Within the band range supported by the radio frequencies of the base station, if no interference area of any working device on a band overlaps the interference area of the base station, the band is idle to the base station. Therefore, by creating an interference diagram, a base station control unit may obtain a set of unauthorized bands that are currently idle in the band range supported by the radio frequencies of the base station. It should be noted that in the embodiment of the present invention, the central control unit may obtain, from a database, the set of unauthorized bands that are currently idle in the band range supported by the radio frequencies of the base station.

103. Send a bandwidth request response message including the spectrum allocation scheme, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

After determining the spectrum allocation scheme, the central control unit sends a bandwidth request response message including the spectrum allocation scheme to the base station, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station. The set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station.

It should be noted that in the embodiment of the present invention, if the set of unauthorized bands that are currently idle is not suitable for creating an allocation scheme satisfying the bandwidth requirement on unauthorized bands of the base station, the central control unit carries request failure information in the sent bandwidth request response message, to notify the base station of bandwidth request failure.

In the embodiment of the present invention, a central control unit determines a spectrum allocation scheme according to radio frequency capabilities of a base station, a bandwidth requirement on unauthorized bands of the base station, and a set of authorized bands of the base station, which are included in a bandwidth request message, and according to an obtained set of unauthorized bands that are currently idle. By aggregating the bandwidth requirement on the authorized bands to the unauthorized band allocated to the base station, the determined spectrum allocation scheme falls within the radio frequency capabilities of the base station, thereby reducing the probability of failure of the spectrum allocation scheme, reducing the number of radio frequency chains required by the base station, saving radio frequency resources, and implementing dynamic spectrum allocation.

In the embodiment of the present invention, the central control unit determines a spectrum allocation scheme according to the bandwidth request message sent by the base station and the set of unauthorized bands that are currently idle, where the set of authorized bands of the base station, which is included in the bandwidth request message, includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station. When parameters included in the set of authorized bands of the base station in the bandwidth request message are different, the methods for the central control unit to determine the spectrum allocation scheme are different. For better understanding of the technical solutions of the present invention, referring to FIG. 2, when the set of authorized bands of the base station included in the bandwidth request message is a set for a first authorized band that share radio frequency capabilities with the unauthorized bands and are aggregated and dynamically available on the base station, a dynamic spectrum allocation method is provided according to an embodiment of the present invention. The method includes the following steps:

201. Receive a bandwidth request message sent by a base station, where the bandwidth request message includes radio frequency capabilities of the base station, a bandwidth requirement on unauthorized bands of the base station, and a set for a first authorized band that share radio frequency capabilities with the unauthorized bands and are aggregated and dynamically available on the base station.

The central control unit manages resources of unauthorized bands, and performs dynamic spectrum allocation according to the bandwidth request of the base station. In the embodiment of the present invention, the central control unit receives a bandwidth request message sent by the base station, where the bandwidth request message includes radio frequency capabilities of the base station, a bandwidth requirement on unauthorized bands of the base station, and a set for a first authorized band that share radio frequency capabilities with the unauthorized bands and are aggregated and dynamically available on the base station. Further, the bandwidth request message may include information such as transmit power of the base station, geographic location information of the base station, and a base station system version identifier.

202. Determine whether a set of unauthorized bands that are currently idle can satisfy the bandwidth requirement on unauthorized bands of the base station; if yes, perform step 203; otherwise, perform step 210.

After receiving the bandwidth request message, the central control unit determines whether the set of unauthorized bands that are currently idle can satisfy the bandwidth requirement on unauthorized bands of the base station. For example, if the set of unauthorized bands that are currently idle is $\{6\,M, 8\,M\}$ and the bandwidth requirement on unauthorized bands of the base station is 10 M, because 6 M+8 M is greater than 10 M, the bandwidth requirement of the base station can be satisfied.

203. From the set of unauthorized bands that are currently idle, obtain a first spectrum set satisfying the bandwidth requirement on the unauthorized bands of the base station.

In the embodiment of the present invention, if the set of unauthorized bands that are currently idle can satisfy the bandwidth requirement on the unauthorized bands of the base station, the first spectrum set satisfying the bandwidth requirement on unauthorized bands of the base station is obtained from the set of unauthorized bands that are currently idle. If the set of unauthorized bands that are currently idle is $WS=\{WS_1, WS_2, \ldots, WS_t, t\in N\}$ and the bandwidth requirement of the base station is $$|ULB| = \sum_{i=1}^{f}(|\text{frac}\_ULB_i|),$$

and if the WS can satisfy the bandwidth requirement |ULB| of the base station, where $$\text{frac}\_ULB = \{\text{frac}\_ULB_1, \text{frac}\_ULB_2, \ldots, \text{frac}\_ULB_f, \text{frac}\_ULB_i \in WS\_S_1\}, \text{ and}$$

each continuous or discontinuous frac_ $ULB_i$ is a part of elements in the WS, the first spectrum set is obtained as $WS\_S=\{WS\_S_1, WS\_S_2, \ldots, WS\_S_f, f\in N\}, f\leq s$.

For example, if the base station is version 8 of a long term evolution (LTE, Long Term Evolution) system, supported basic bandwidths are 1.4 M, 3 M, 5 M, 10 M, and 20 M, the set of unauthorized bands that are currently idle is $\{6\,M, 8\,M\}$, and the bandwidth requirement on unauthorized bands of the base station is 10 M, the spectrum set frac_ULB satisfying the bandwidth requirement on unauthorized bands of the base station may be $\{5\,M, 5\,M\}$, in which the first 5 M belongs to a 6 M spectrum range, and the second 5 M belongs to an 8 M spectrum range, and therefore, the first spectrum set is $\{6\,M, 8\,M\}$.

It should be noted that in the embodiment of the present invention, the bandwidth requirement on unauthorized bands of the base station is combined by basic bandwidths supported by the base station.

204. Determine whether the first spectrum set falls within the radio frequency capabilities of the base station; if yes, perform step 205; otherwise, perform step 206.

In the embodiment of the present invention, the radio frequency capabilities of the base station include: a supported band range, the number of radio frequency chains of carrier aggregation supported, and a type of carrier aggregation supported. Types of carrier aggregation supported include continuous carrier aggregation or discontinuous carrier aggregation. The first spectrum set falls within the radio frequency capabilities of the base station if the band range of the first spectrum set falls within a band range supported by the base station, the number of radio frequency chains of carrier aggregation required by the first spectrum set is less than or equal to the number of radio frequency chains of carrier aggregation supported by the base station, and the type of carrier aggregation is the same as the type of carrier aggregation supported by the base station.

It should be noted that in the embodiment of the present invention, the set of unauthorized bands that are currently idle is obtained from the band range supported by the base station. Therefore, the first spectrum set obtained from the set of unauthorized bands that are currently idle falls within the band range supported by the base station.

It should be noted that if one of the radio frequency chains supported by the base station is shared by authorized bands and unauthorized bands, the number of radio frequency chains and bands shared by authorized bands and unauthorized bands in the authorized bands already used by the base station need to be taken into account in determining whether the number of radio frequency chains of carrier aggregation required by the first spectrum set is less than or equal to the number of radio frequency chains of carrier aggregation supported by the base station and whether it can satisfy continuous carrier aggregation. For example, if the number of independent radio frequency chains supported by the base station in a 700 M-1 G band is 3, and the radio frequency chains are available to both authorized bands and unauthorized bands, where the authorized bands have used 1 radio frequency chain, then the number of remaining radio frequency chains available to the base station in the 700 M-1 G band is 2, and the radio frequency capabilities of the base station cannot satisfy the requirement of the first spectrum set if the first spectrum frequency set requires three discontinuous unauthorized idle bands in the 700 M-1 G band and the unauthorized idle bands and the authorized bands already used do not satisfy continuous carrier aggregation.

205. Determine the spectrum allocation scheme as: allocating the unauthorized bands in the first spectrum set as unauthorized bands available to the base station; and proceed to step 209.

In the embodiment of the present invention, if the first spectrum set falls within the radio frequency capabilities of the base station, the central control unit determines the spectrum allocation scheme as: allocating the unauthorized bands in the first spectrum set as unauthorized bands available to the base station. For example, if the first spectrum set is $\{6\,M, 8\,M\}$, the bandwidth requirement of the base station is 10 M, and the first spectrum set falls within the radio frequency capabilities of the base station, the determined spectrum allocation scheme is: allocating a 5 M bandwidth in a 6 M bandwidth of the unauthorized band in the first spectrum set to the base station, and allocating a 5 M bandwidth in an 8 M bandwidth of the unauthorized band to the base station.

206. Determine whether the first set of authorized bands includes a third set of authorized bands sharing radio frequency capabilities with the unauthorized bands in the first spectrum set; if yes, perform step 207; otherwise, perform step 210.

The central control unit determines whether the first set of authorized bands includes a third set of authorized bands sharing radio frequency capabilities with the unauthorized bands in the first spectrum set.

In the embodiment of the present invention, the first set of authorized bands that share radio frequency capabilities with the unauthorized bands and are aggregated and dynamically available on the base station is:

$$LB\_CRF = \{LB\_CRF_u^1, LB\_CRF_u^2, \ldots, LB\_CRF_u^{k_u}\},$$

and therefore, the central control unit traverses $WS\_S_u$ in the first spectrum set $WS\_S$, and determines whether the $LB\_CRF$ includes $LB\_CRF_v$ sharing radio frequency capabilities with $WS\_S_u$; and, if yes, the $LB\_CRF_v$ is an authorized band in the third set of authorized bands.

207. Determine whether the first spectrum set can aggregate the bandwidth requirement on authorized bands in the third set of authorized bands and fall within the radio frequency capabilities of the base station after the aggregation; if the first spectrum set can aggregate the bandwidth requirement and fall within the radio frequency capabilities of the base station after the aggregation, perform step 208; otherwise, perform step 210.

The central control unit determines whether the first spectrum set can aggregate the bandwidth requirement on authorized bands in the third set of authorized bands and fall within the radio frequency capabilities of the base station after the aggregation.

In the embodiment of the present invention, that the central control unit traverses the first spectrum set and determines whether the first spectrum set can aggregate the bandwidth requirement on authorized bands in the third set of authorized bands is specifically: determining whether an unauthorized band $WS\_S_u$ in the first spectrum set can aggregate bandwidth requirements of $M_u$ authorized bands of the third set of authorized bands to make $$|WS\_S_u| \geq |\text{frac\_ULB}_u| + \sum_{i=0}^{M_u} |LB\_CRF_u^i|;$$

and then determining whether the first spectrum set that aggregates the bandwidth requirement on authorized bands in the third set of authorized bands falls within the radio frequency capabilities of the base station; and if both determinations indicate a positive result, updating the bandwidth corresponding to a frac_ULB$_u$ element in the frac_ULB set to $$|\text{frac\_ULB}_u| + \sum_{i=0}^{M_u} |LB\_CRF_u^i|$$

so that the spectrum allocation scheme can be determined. For example, the central control unit traverses the first spectrum set if the first spectrum set is {6 M, 8 M}, the bandwidth requirement of the base station is |ULB|=frac_ULB={5 M, 5 M}, and the bandwidth requirement on authorized bands in the third set of authorized bands is 3 M, where 6 M<5 M+3 M and 8 M=5 M+3 M, and therefore, the 8M bandwidth in the first spectrum set can aggregate the 3 M bandwidth of the authorized band in the third set of authorized bands. If the first spectrum set falls within the radio frequency capabilities of the base station after the aggregation, the updated bandwidth is frac_ULB={5M, 8M}.

208. Determine the spectrum allocation scheme as: allocating the unauthorized bands in the first spectrum set as unauthorized bands available to the base station, and aggregating the bandwidth requirement on authorized bands in the third set of authorized bands to the unauthorized bands in the first spectrum set.

In the embodiment of the present invention, if the first spectrum set can aggregate the bandwidth requirement on authorized bands in the third set of authorized bands and fall within the radio frequency capabilities of the base station after the aggregation, the base station determines the spectrum allocation scheme as: allocating the unauthorized bands in the first spectrum set as unauthorized bands available to the base station, and aggregating the bandwidth requirement on unauthorized bands in the third set of authorized bands to the unauthorized bands in the first spectrum set. For example, the first spectrum set is {6 M, 8 M}, the bandwidth requirement of the base band is 10 M, the bandwidth requirement on unauthorized bands in the third set of authorized bands is 3 M, and the 8 M bandwidth in the first spectrum set can aggregate the 3 M bandwidth requirement on authorized bands. Therefore, the spectrum allocation scheme is: allocating the 5 M bandwidth in the 6 M bandwidth in the first spectrum set and the 8 M bandwidth to the base station, releasing the 3 M bandwidth of the authorized band, and switching a terminal service or a terminal in a connected state on the 3 M bandwidth over to the 8 M bandwidth.

209. Send a bandwidth request response message including the spectrum allocation scheme, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

After determining the spectrum allocation scheme, the central control unit sends the bandwidth request response message including the spectrum allocation scheme, where the spectrum allocation scheme is used to indicate the information of the unauthorized band allocated to the base station, and indicate the need of aggregating the bandwidth requirement on at least one authorized band in the set of authorized bands of the base station to the unauthorized band allocated to the base station. The set of authorized bands of the base station refers to authorized bands in the set of authorized bands that share radio frequency capabilities with the unauthorized bands and are aggregated and dynamically available on the base station.

It should be noted that in the embodiment of the present invention, if determining the spectrum allocation scheme in step 205 is: allocating unauthorized bands in the first spectrum set as unauthorized bands available to the base station, in the spectrum allocation scheme carried in the bandwidth request response message in step 209, the information of "need of aggregating a bandwidth requirement on at least one authorized band in the set of authorized bands of the base station to the unauthorized band allocated to the base station" is null.

210. Send a bandwidth request response message that includes spectrum allocation failure.

In the embodiment of the present invention, if the set of unauthorized bands that are currently idle cannot meet the bandwidth requirement on the unauthorized band of the base station, or if in step 206, the first set of authorized bands does not include the third set of authorized bands sharing radio frequency capabilities with the unauthorized bands in the first spectrum set, or if in step 207, the first spectrum set cannot aggregate the bandwidth requirement on the authorized bands in the third set of authorized bands, or if the first spectrum set can aggregate the bandwidth requirement on the authorized bands in the third set of authorized bands but cannot fall within the radio frequency capabilities of the base station after the aggregation, the central control unit sends the bandwidth request response message including spectrum allocation failure to the base station.

It should be noted that in the embodiment of the present invention, step 206 may be performed first. That is, first, determine whether the first set of authorized bands includes a third set of authorized bands sharing radio frequency capabilities with the unauthorized bands in the first spectrum set; if not, perform step 205, that is, determine whether the first spectrum set falls within the radio frequency capabilities of the base station. In a practical application, the specific method for determining the spectrum allocation scheme according to parameters in the bandwidth request message may be designed according to a specific situation. The specific method is not restricted herein.

In the embodiment of the present invention, a bandwidth request message includes radio frequency capabilities of a base station and parameters such as a set for a first authorized band that share radio frequency capabilities with unauthorized bands and are aggregated and dynamically available on the base station, and therefore, the central control unit can determine a spectrum allocation scheme that is fit for the radio frequency capabilities of the base station, to reduce the probability of failure of the spectrum allocation scheme; and can aggregate the bandwidth requirement on the authorized bands to the unauthorized bands, to reduce the number of radio frequency chains required by the base station and save resources.

Figure 2A:
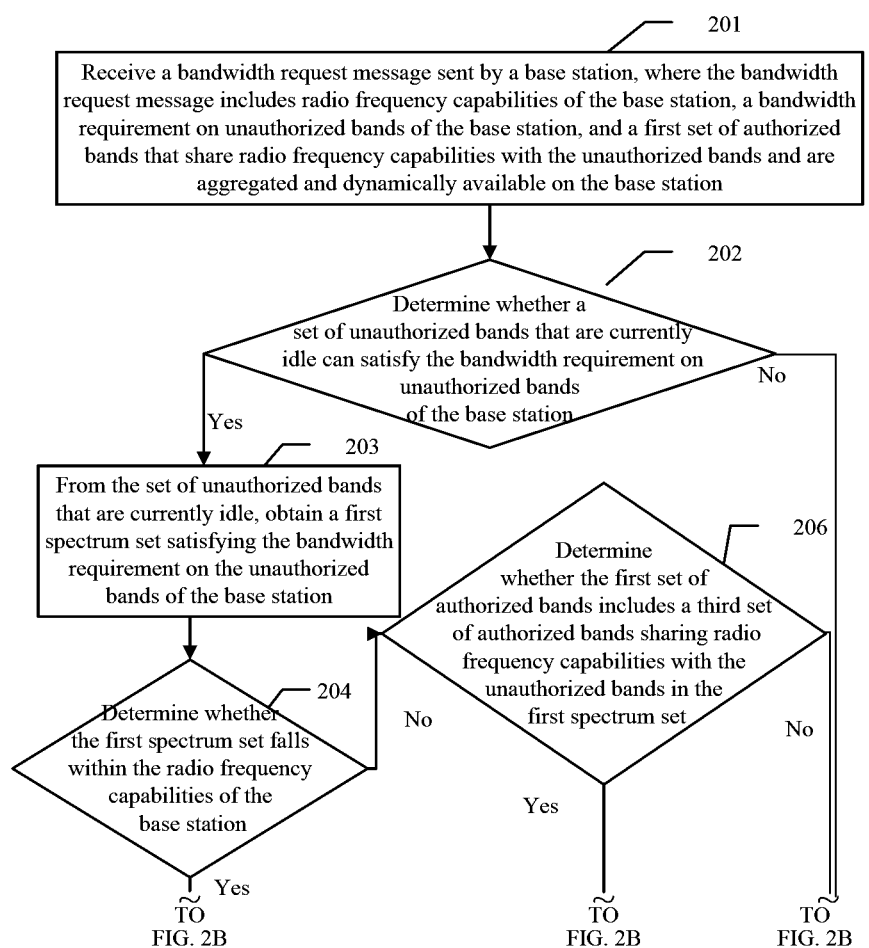
FIG. 2A and FIG. 2B is another schematic diagram of a dynamic spectrum allocation method according to an embodiment of the present invention.
Figure 2B:
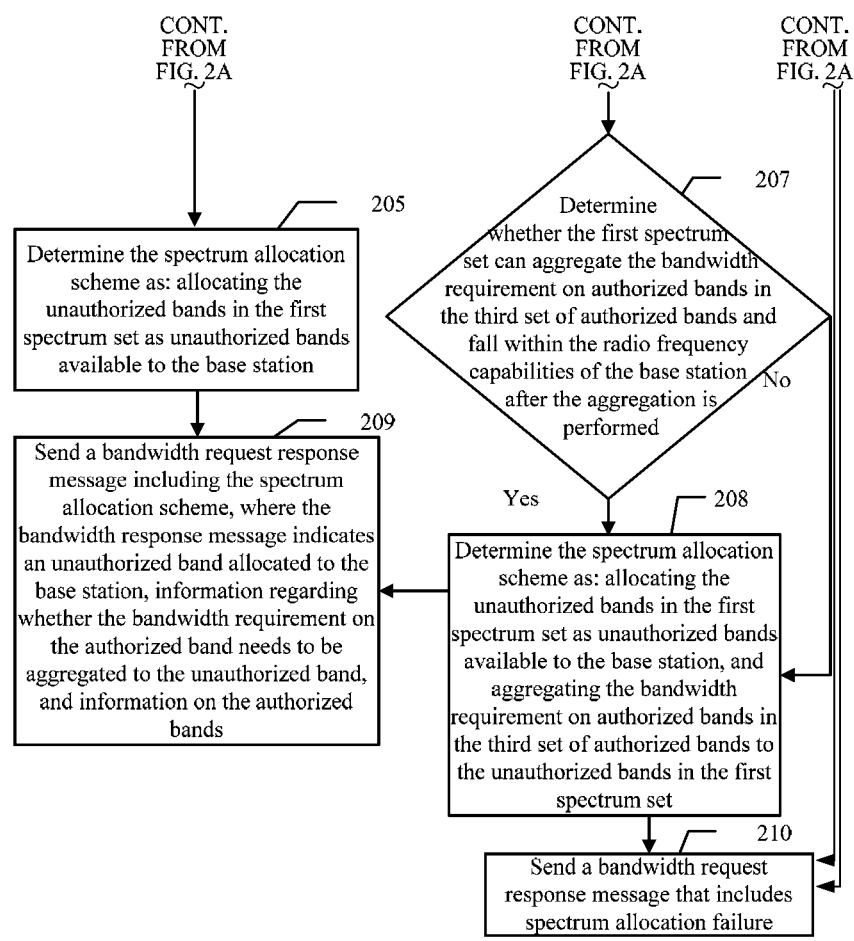

For better understanding of the technology, the following describes the technical solution in the embodiment shown in FIG. 2 by using a specific application instance.

It is assumed that basic bandwidths supported by a base station in a long term evolution-advanced (LTE-A, Long Term Evolution-Advanced) system that supports carrier aggregation are 1.4 M, 3 M, 5 M, 10 M, 15 M, and 20 M; the base station's unauthorized bands that are currently idle include Band 64 and Band 66, which are two idle unauthorized discontinuous bands; the band range of Band 64 is 770 M-776 M, and the band range of Band 66 is 782 M-788 MHz, expressed as WS={64, 66} (or expressed as {770 M-776 M, 782 M-788 M}).

1) The central control unit receives a bandwidth request message sent by the base station, where the bandwidth request message includes the following information: the bandwidth requirement |ULB| on unauthorized bands of the base station is 8 M, the first set of authorized bands that share radio frequency capabilities with the unauthorized bands and are aggregated and dynamically available on the base station is 3 M (704 M-707 M), the band range supported by the radio frequency capabilities of the base station is 700 M-1 G, aggregation of 2 carriers is supported, and discontinuous carrier aggregation is supported.

2) The central control unit determines whether the set (WS) of unauthorized bands that are currently idle meets the bandwidth requirement 8 M on unauthorized bands of the base station. In the application instance of the present invention, the 5 M bandwidth in Band 64 is aggregated with the 3 M bandwidth in Band 66, or the 3 M bandwidth in Band 64 is aggregated with the 5 M bandwidth in Band 66, to meet the bandwidth requirement on the authorized bands of the base station, and then, the first spectrum set is obtained as {6 M, 6 M}.

3) Determine whether the first spectrum set falls within the radio frequency capabilities of the base station. Neither Band 64 nor Band 66 is a continuous carrier to the authorized band 3 M (704 M-707 M) that shares radio frequency capabilities with the unauthorized bands and is aggregated and dynamically available. Therefore, three radio frequency chains are required. However, because the number of radio frequency chains supported by the base station is 2, the first spectrum set goes beyond the radio frequency capabilities of the base station.

4) Determine whether the first set of authorized bands includes a third set of authorized bands sharing radio frequency capabilities with unauthorized bands in the first spectrum set. In the embodiment of the present invention, the third set of authorized bands is {3 M}, and therefore, 5 M may be used on an unauthorized band, and 3 M of another unauthorized band may be aggregated with the bandwidth requirement of 3 M (704 M-707 M) bandwidth, so as to enable aggregation of two discontinuous carriers. Therefore, the spectrum allocation scheme here is: using a 5M bandwidth on Band 64, and aggregating a 3 M bandwidth on Band 66 with a bandwidth requirement of 3 M (704 M-707 M) bandwidth sharing radio frequency capabilities with the 3 M bandwidth on Band 66; or, using a 5 M bandwidth on Band 66, and aggregating a 3 M bandwidth on Band 64 with a bandwidth requirement of 3 M (704 M-707 M) bandwidth sharing radio frequency capabilities with the 3 M bandwidth on Band 64.

5) The central control unit sends a bandwidth request response message including the spectrum allocation scheme to the base station.

Figure 3A:
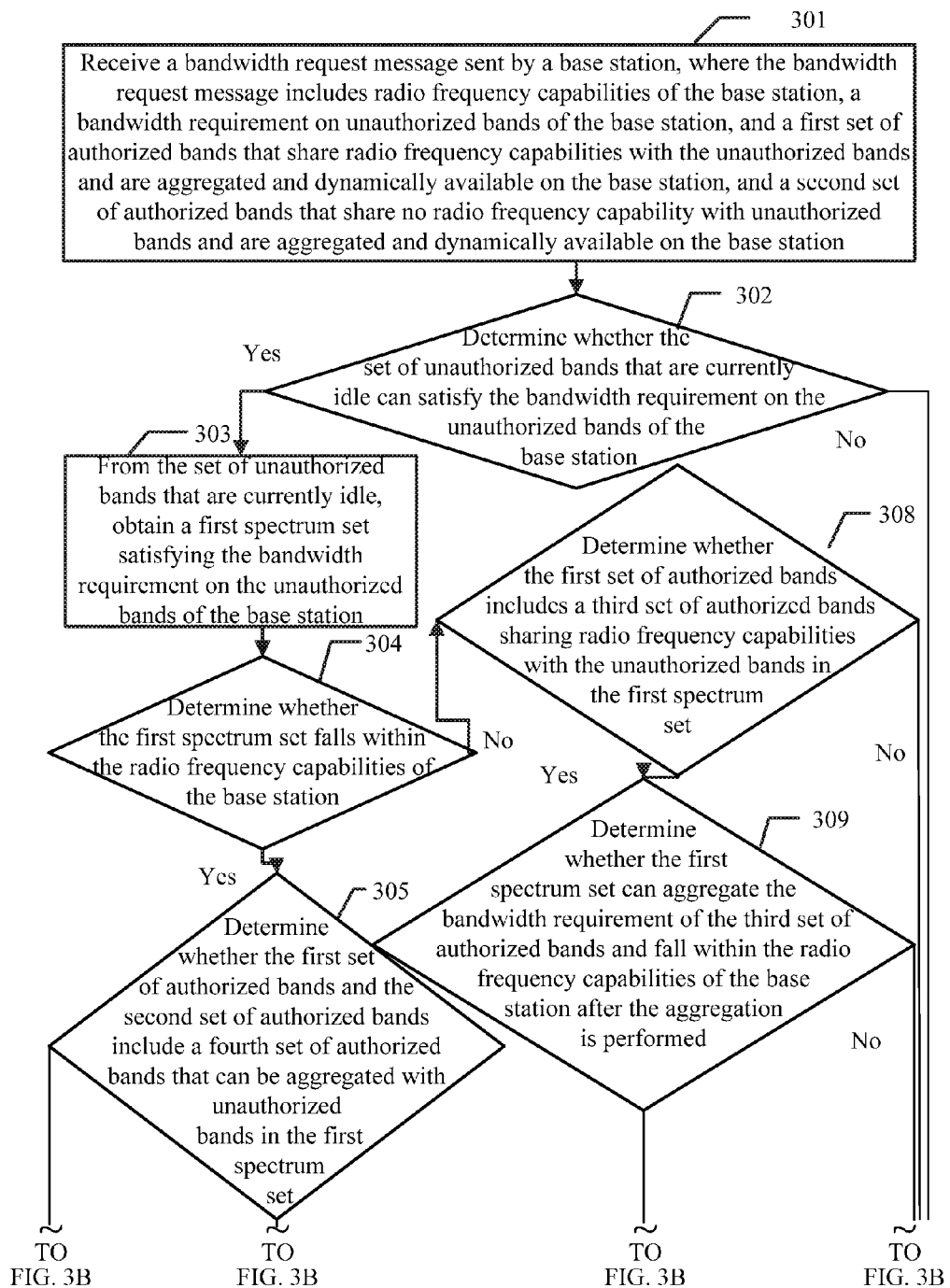
FIG. 3A and FIG. 3B is another schematic diagram of a dynamic spectrum allocation method according to an embodiment of the present invention.
Figure 3B:
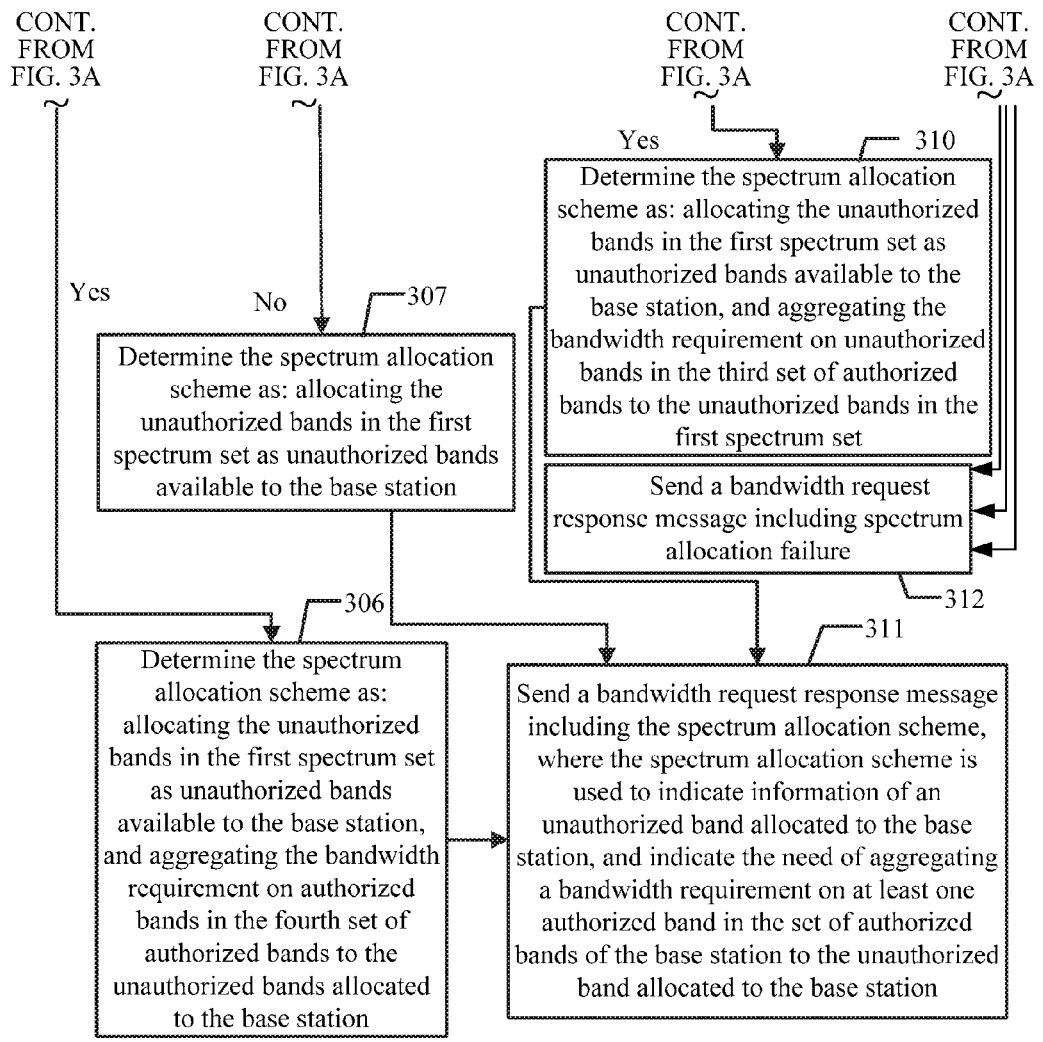

The embodiment shown in FIG. 2 describes a method for determining a spectrum allocation scheme when a bandwidth request message includes a set for a first authorized band that share radio frequency capabilities with unauthorized bands and are aggregated and dynamically available on a base station. The following describes a method for determining a spectrum allocation scheme when authorized bands of a base station in a bandwidth request message include a set for a first authorized band that share radio frequency capabilities with unauthorized bands and are aggregated and dynamically available on the base station, and a set for a second authorized band that share no radio frequency capability with unauthorized bands and are aggregated and dynamically available. Referring to FIG. 3, a dynamic spectrum allocation method is provided according to an embodiment of the present invention, including the following steps:

301. Receive a bandwidth request message sent by a base station, where the bandwidth request message includes radio frequency capabilities of the base station, a bandwidth requirement on unauthorized bands of the base station, and a set for a first authorized band that share radio frequency capabilities with the unauthorized bands and are aggregated and dynamically available on the base station, and a set for a second authorized band that share no radio frequency capability with unauthorized bands and are aggregated and dynamically available on the base station.

The central control unit manages resources of unauthorized bands, and performs dynamic spectrum allocation according to the bandwidth request of the base station. In the embodiment of the present invention, the central control unit receives a bandwidth request message sent by the base station, where the bandwidth request message includes radio frequency capabilities of the base station, a bandwidth requirement on unauthorized bands of the base station, and a set for a first authorized band that share radio frequency capabilities with the unauthorized bands and are aggregated and dynamically available on the base station, and a set for a second authorized band that share no radio frequency capability with unauthorized bands and are aggregated and dynamically available on the base station. Further, the bandwidth request message may include information such as transmit power of the base station, geographic location information of the base station, and a base station system version identifier.

302. Determine whether the set of unauthorized bands that are currently idle can satisfy the bandwidth requirement on unauthorized bands of the base station; if yes, perform step 303; otherwise, perform step 312.

303. From the set of unauthorized bands that are currently idle, obtain a first spectrum set satisfying the bandwidth requirement on the unauthorized bands of the base station.

Step 302 and step 303 are the same as step 202 and step 203 in the embodiment shown in FIG. 2, respectively, and are not repeated here any further.

304. Determine whether the first spectrum set falls within the radio frequency capabilities of the base station; if yes, perform step 305; otherwise, perform step 308.

305. Determine whether the first set of authorized bands and the second set of authorized bands include a fourth set of authorized bands that can be aggregated with unauthorized bands in the first spectrum set; if yes, perform step 306; otherwise, perform step 307.

If the obtained first spectrum set falls within the radio frequency capabilities of the base station, the central control unit determines whether the first set of authorized bands and the second set of authorized bands include the fourth set of authorized bands that can be aggregated with unauthorized bands in the first spectrum set. The first set of authorized bands that share radio frequency capabilities with the unauthorized bands and are aggregated and dynamically available on the base station is LB_CRF, and the second set of authorized bands that share no radio frequency capability with the unauthorized bands and are aggregated and dynamically available on the base station is LB_D. Therefore, the fourth set of authorized bands includes authorized bands sharing radio frequency capabilities with the unauthorized bands, and/or authorized bands that share no radio frequency capability with the unauthorized bands.

In the embodiment of the present invention, the central control unit traverses $WS\_S_u$ in the first spectrum set WS_S, and determines whether the LB_CRF includes $LB\_CRF_v$ sharing radio frequency capabilities with $WS\_S_u$; and traverses $WS\_S_u$ in the first spectrum set WS_S, and determines whether the LB_D includes $LB\_D_w$ sharing radio frequency capabilities with $WS\_S_u$, to make $|WS\_S_u| \geq |frac\_ULB_u| + |LB\_CRF_v| + |LB\_D_w|$, and therefore, $LB\_CRF_v$ and/or $LB\_D_w$ are authorized bands in the fourth set of authorized bands.

306. Determine the spectrum allocation scheme as: allocating the unauthorized bands in the first spectrum set as unauthorized bands available to the base station, and aggregating the bandwidth requirement on authorized bands in the fourth set of authorized bands to the unauthorized bands allocated to the base station.

If LB_CRF and/or LB_D includes the fourth set of authorized bands that can be aggregated with the first spectrum set, the central control unit determines the spectrum allocation scheme as: allocating the unauthorized bands in the first spectrum set as unauthorized bands available to the base station, and aggregating the bandwidth requirement on authorized bands in the fourth set of authorized bands to the unauthorized bands allocated to the base station.

307. Determine the spectrum allocation scheme as: allocating the unauthorized bands in the first spectrum set as unauthorized bands available to the base station; and proceed to step 311.

If neither LB_CRF nor LB_D includes the fourth set of authorized bands that can be aggregated with the first spectrum set, the central control unit determines the spectrum allocation scheme as: allocating the unauthorized bands in the first spectrum set as unauthorized bands available to the base station.

308. Determine whether the first set of authorized bands includes a third set of authorized bands sharing radio frequency capabilities with the unauthorized bands in the first spectrum set; if yes, perform step 309; otherwise, perform step 312.

309. Determine whether the first spectrum set can aggregate the bandwidth requirement on authorized bands in the third set of authorized bands and fall within the radio frequency capabilities of the base station after the aggregation; if the first spectrum set can aggregate the bandwidth requirement and fall within the radio frequency capabilities of the base station after the aggregation, perform step 310; otherwise, perform step 312.

310. Determine the spectrum allocation scheme as: allocating the unauthorized bands in the first spectrum set as unauthorized bands available to the base station, and aggregating the bandwidth requirement on unauthorized bands in the third set of authorized bands to the unauthorized bands in the first spectrum set.

311. Send a bandwidth request response message including the spectrum allocation scheme, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

312. Send a bandwidth request response message including spectrum allocation failure.

In the embodiment of the present invention, steps 308 to 312 are the same as steps 206 to 210 in the embodiment shown in FIG. 2, respectively, and are not repeated here any further.

It should be noted that in the embodiment of the present invention, if determining the spectrum allocation scheme in step 307 is: allocating unauthorized bands in the first spectrum set as unauthorized bands available to the base station, in the spectrum allocation scheme included in the bandwidth request response message in step 311, the information of "need of aggregating a bandwidth requirement on at least one authorized band in the set of authorized bands of the base station to the unauthorized band allocated to the base station" is null.

In the embodiment of the present invention, when the determined spectrum allocation scheme is: allocating the unauthorized bands in the first spectrum set as unauthorized bands available to the base station and aggregating the bandwidth requirement on authorized bands in the third or fourth set of authorized bands to the unauthorized bands allocated to the base station, the probability of failure of the spectrum allocation scheme can be reduced effectively, the number of radio frequency chains required by the base station can be reduced, resources can be saved, and system flexibility can be improved.

For better understanding of the technical solution in the embodiment shown in FIG. 3, the following gives more details by using a specific application instance.

It is assumed that basic bandwidths supported by a base station in a long term evolution-advanced (LTE-A, Long Term Evolution-Advanced) system that supports carrier aggregation are 1.4 M, 3 M, 5 M, 10 M, 15 M, and 20 M; the base station's unauthorized bands that are currently idle include Band 64, Band 65, and Band 66, which are three idle unauthorized discontinuous bands; the band range of Band 64 is 770 M-776 M, the band range of Band 65 is 776 M-782 M, and the band range of Band 66 is 782 M-788 MHz, expressed as WS={64, 65, 66}.

1) The central control unit receives a bandwidth request message from the base station, where the message includes the following information: |ULB|=13 M, LB_CRF={3 M (704 M-707 M)}, LB_D={10 M (1900 M-1910 M), 5 M (1850 M-1855 M)}, the band range supported by the radio frequency capabilities of the base station is 700 M-1 G, aggregation of 2 discontinuous carriers is supported, and aggregation of unauthorized bands is supported.

2) The central control unit determines whether the set WS of unauthorized bands that are currently idle can satisfy the bandwidth requirement |ULB| 13 M on the unauthorized bands of the base station. Because the total bandwidth of the WS is 18 M, which is greater than the bandwidth requirement on unauthorized bands of the base station, the WS can satisfy |ULB|, and the first spectrum set is {10 M, 8 M}.

3) Determine whether the first spectrum set falls within the radio frequency capabilities of the base station. In this application instance, 1 radio frequency chain is required, which falls within the radio frequency capabilities of the base station, and therefore, the first spectrum set falls within the radio frequency capabilities of the base station.

4) Determine whether LB_CRF and LB_D include the fourth set of authorized bands that can be aggregated with the first spectrum set. In this application instance, LB_CRF={3 M (704 M-707 M)}, LB_D={10 M (1900 M-1910 M), and 5 M (1850 M-1855 M)}; the bands in LB_CRF and LB_D are aggregated with the bandwidth requirement on the unauthorized bands of the base station, and a maximum combination with the aggregated bandwidth less than or equal to 18 M is determined, where 3+13<5+13; therefore, to maximize the continuous aggregated bandwidth, the 5 M (1850 M-1855 M) band in the LB_D is aggregated with the first spectrum set. The {5 M (1850 M-1855 M)} is an authorized band in the fourth set of authorized bands.

5) Determine the spectrum allocation scheme as: allocating the unauthorized bands in the first spectrum set {10 M, 8 M} as unauthorized bands available to the base station, and aggregating the authorized band {5 M (1850 M-1855 M)} in the fourth set of authorized bands with the first spectrum set. The detailed spectrum allocation scheme is: releasing the authorized band {5 M (1850 M-1855 M)} in the fourth set of authorized bands, and aggregating the bandwidth requirement {5 M (1850 M-1855 M)} in the fourth set of authorized bands to three unauthorized bands: Band 64, Band 65, and Band 66, that is, switching a terminal service or a terminal in a connected state on the 5 M (1850 M-1855 M) band over to the aggregated unauthorized band.

Figure 4:
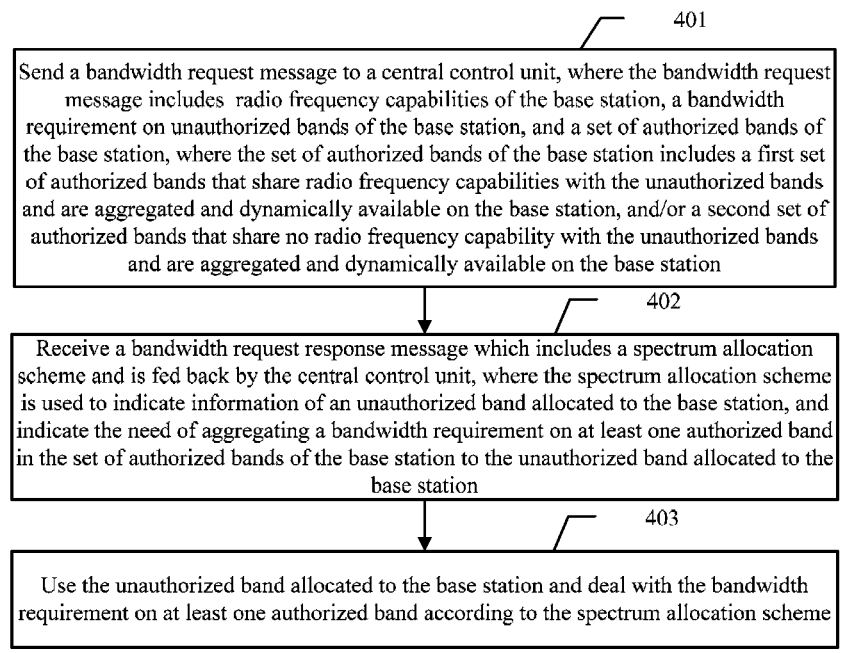
FIG. 4 is a schematic diagram of a dynamic spectrum allocation method according to an embodiment of the present invention.

In the embodiment of the present invention, after receiving a bandwidth request message sent by a base station, a central control unit creates a spectrum allocation scheme, and feeds back the spectrum allocation scheme to the base station by carrying it in a bandwidth request response message; according to the response message fed back by the central control unit, the base station uses the unauthorized band to process the authorized band. Referring to FIG. 4, a dynamic spectrum allocation method is provided according to an embodiment of the present invention, including the following steps:

401. Send a bandwidth request message to a central control unit, where the bandwidth request message includes radio frequency capabilities of the base station, a bandwidth requirement on unauthorized bands of the base station, and a set of authorized bands of the base station, where the set of authorized bands of the base station includes a set for a first authorized band that share radio frequency capabilities with the unauthorized bands and are aggregated and dynamically available on the base station, and/or a set for a second authorized band that share no radio frequency capability with the unauthorized bands and are aggregated and dynamically available on the base station.

When the base station needs to use an unauthorized band, the base station sends a bandwidth request message to the central control unit. The bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station. In addition, the bandwidth request message may further include geographic location information of the base station, the transmit power of the base station, and a base station system version identifier.

402. Receive a bandwidth request response message which includes a spectrum allocation scheme and is fed back by the central control unit, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

After receiving the bandwidth request message sent by the base station, the central control unit determines a spectrum allocation scheme according to parameters included in the bandwidth request message and the set of unauthorized bands that are currently idle. For the specific spectrum allocation method in the embodiment of the present invention, reference may be made to the content described in the embodiment shown in FIG. 1 to FIG. 3, and details are not repeated here any further. After determining the spectrum allocation scheme, the central control unit sends a bandwidth request response message including the spectrum allocation scheme to the base station. Therefore, the base station receives the bandwidth request response message which includes the spectrum allocation scheme and fed back by the central control unit, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station. It should be noted that in the embodiment of the present invention, if the central control unit determines failure of the spectrum allocation scheme, the central control unit feeds back a bandwidth request response message including spectrum allocation failure information to the base station, notifying the base station of bandwidth request failure.

403. Use the unauthorized band allocated to the base station and dealing with the bandwidth requirement on at least one authorized band according to the spectrum allocation scheme.

After receiving the bandwidth request response message fed back by the central control unit, the base station uses the unauthorized band allocated to the base station and deals with the bandwidth requirement on at least one authorized band according to the spectrum allocation scheme included in the bandwidth request response message.

In the embodiment of the present invention, if the spectrum allocation scheme indicates the need of aggregating the bandwidth requirement on at least one authorized band to the unauthorized band allocated to the base station, the base station releases the at least one authorized band, and switches a terminal service or a terminal in a connected state on the authorized band over to the unauthorized band allocated to the base station.

In the embodiment of the present invention, a base station sends a bandwidth request message including radio frequency capabilities of the base station, a bandwidth requirement on an unauthorized band of the base station, and a set of authorized bands of the base station, so that, by aggregating the bandwidth requirement on the authorized band to the unauthorized band, the central control unit can create a spectrum allocation scheme that is fit for the radio frequency capabilities of the base station, thereby reducing the probability of failure of the spectrum allocation scheme and reducing the number of radio frequency chains required.

Figure 5:
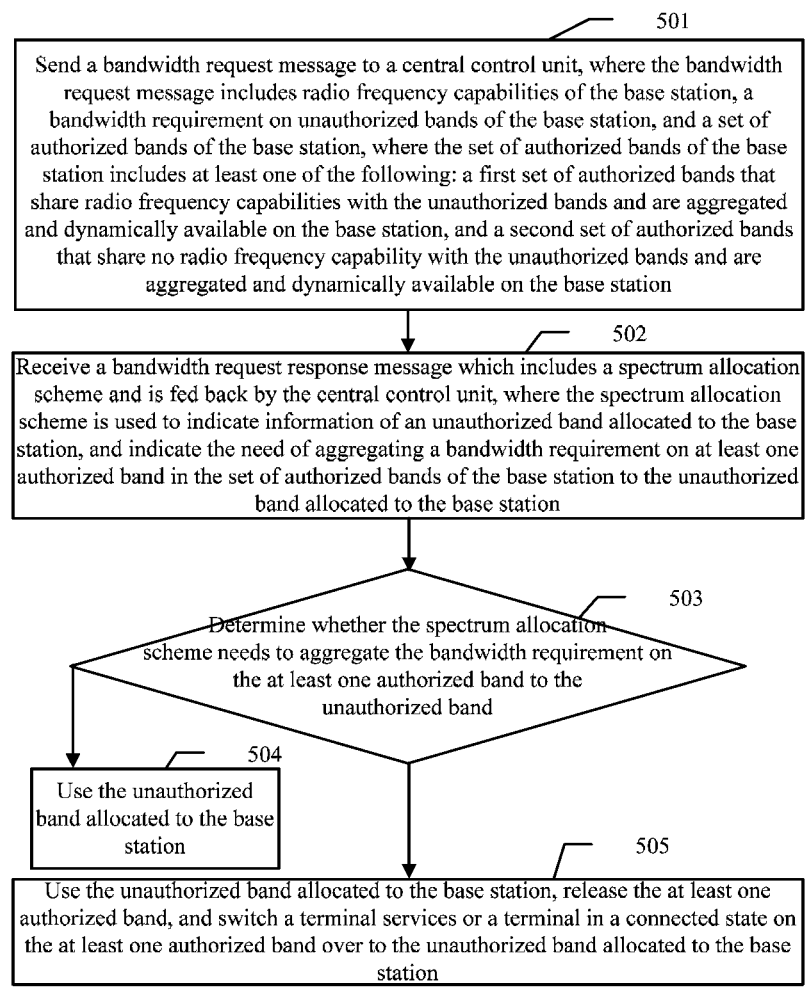
FIG. 5 is another schematic diagram of a dynamic spectrum allocation method according to an embodiment of the present invention.

For better understanding of the technology, referring to FIG. 5, a dynamic spectrum allocation method is provided according to an embodiment of the present invention, including the following steps:

501. Send a bandwidth request message to a central control unit, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station.

502. Receive a bandwidth request response message which includes a spectrum allocation scheme and is fed back by the central control unit, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

Step 501 and step 502 are the same as step 401 and step 402 shown in FIG. 4, respectively, and are not repeated here any further.

503. Determine whether the spectrum allocation scheme needs to aggregate the bandwidth requirement on the at least one authorized band to the unauthorized band; if yes, perform step 504; otherwise, perform step 505.

The spectrum allocation scheme is used to indicate the need of aggregating the bandwidth requirement on at least one authorized band in the set of authorized bands of the base station to the unauthorized band allocated to the base station. The base station obtains the spectrum allocation scheme from the bandwidth request response message, and determines whether the spectrum allocation scheme needs to aggregate the bandwidth requirement on the at least one authorized band to the unauthorized band.

504. Use the unauthorized band allocated to the base station, release the at least one authorized band, and switch a terminal service or a terminal in a connect state on the at least one authorized band over to the unauthorized band allocated to the base station.

If it needs to aggregate the bandwidth requirement on the authorized band to the unauthorized band, the base station releases the authorized band, switches a terminal service or a terminal in a connected state on the authorized band over to the unauthorized band, and uses the aggregated unauthorized band.

505. Use the unauthorized band allocated to the base station.

If it is not required to aggregate the bandwidth requirement on the authorized band to the unauthorized band, the base station uses the unauthorized band, allocated to the base station, according to the spectrum allocation scheme.

Besides, after using the band according to the bandwidth request response message, the base station sends a bandwidth request confirmation message including the band used by the base station. After receiving the bandwidth request confirmation message, the central control unit updates information on occupation of the unauthorized band, or the central control unit instructs another device, such as a database, to update the information on occupation of the unauthorized band.

In the embodiment of the present invention, the bandwidth requirement on the authorized band is aggregated to the unauthorized band, thereby reducing the probability of failure of the spectrum allocation scheme and reducing the number of radio frequency chains required by the base station, and saving resources.

Figure 6:
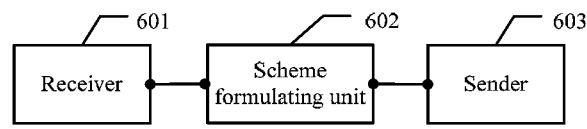
FIG. 6 is a schematic diagram of a central control unit according to an embodiment of the present invention.

Referring to FIG. 6, a central control unit is provided according to an embodiment of the present invention, including:

a receiver 601, configured to receive a bandwidth request message sent by a base station, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station;

a scheme formulating unit 602, configured to determine a spectrum allocation scheme according to the radio frequency capabilities of the base station, the bandwidth requirement on unauthorized bands of the base station, the set of authorized bands of the base station, and an obtained set of unauthorized bands that are currently idle, where the scheme formulating unit 602 may be specifically a processor; and a sender 603, configured to send a bandwidth request response message including the spectrum allocation scheme, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station.

In the embodiment of the present invention, a sender 601 receives a bandwidth request message sent by a base station; a scheme formulating unit 602 determines a spectrum allocation scheme according to the bandwidth request message received by the sender 601 and an obtained set of unauthorized bands that are currently idle; and the sender 603 sends a bandwidth request response message including the spectrum allocation scheme to the base station.

In the embodiment of the present invention, the central control unit receives a bandwidth request message, and determines a spectrum allocation scheme according to radio frequency capabilities of the base station, a bandwidth requirement on an unauthorized band of the base station, and a set of authorized bands of the base station, which are included in the bandwidth request message, and according to an obtained set of unauthorized bands that are currently idle, so that the spectrum allocation scheme determined by the central control unit falls within the radio frequency capabilities of the base station, and the probability of failure of the spectrum allocation scheme is reduced; the bandwidth requirement on the authorized band is aggregated to the unauthorized band when the spectrum allocation scheme is created, thereby reducing the number of radio frequency chains and saving resources.

Figure 7:
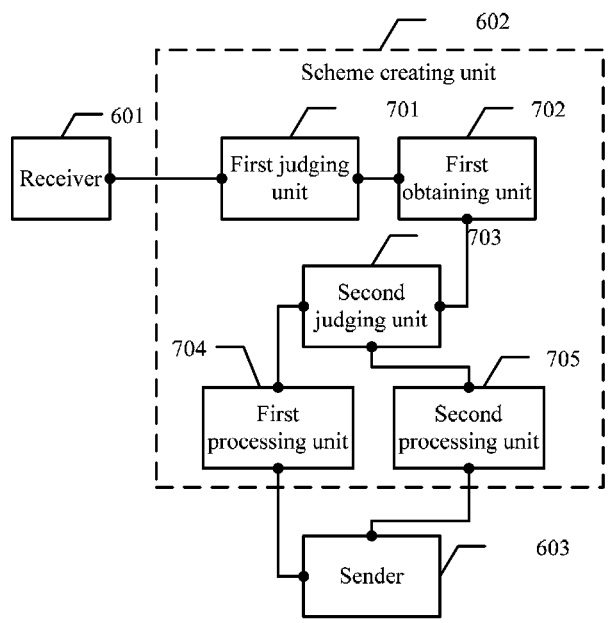
FIG. 7 is another schematic diagram of a central control unit according to an embodiment of the present invention.

For better understanding of the technology, FIG. 7 shows a central control unit in an embodiment of the present invention, including the receiver 601, the scheme formulating unit 602, and the sender 603 shown in FIG. 6. The units are the same as those described in the embodiment shown in FIG. 6, and are not repeated here any further.

The scheme formulating unit 602 includes:

a first determining unit 701, configured to determine whether the set of unauthorized bands that are currently idle can satisfy the bandwidth requirement on the unauthorized bands of the base station;

a first obtaining unit 702, configured to obtain, from the set of unauthorized bands that are currently idle, a first spectrum set satisfying the bandwidth requirement on unauthorized bands of the base station if the set of unauthorized bands that are currently idle can satisfy the bandwidth requirement on the unauthorized bands of the base station;

a second determining unit 703, configured to determine whether the first spectrum set falls within the radio frequency capabilities of the base station;

a first processing unit 704, configured to: if the first spectrum set goes beyond the radio frequency capabilities of the base station, determine whether the first set of authorized bands includes a third set of authorized bands sharing radio frequency capabilities with the unauthorized bands in the first spectrum set; if yes, determine whether the first spectrum set can aggregate the bandwidth requirement on authorized bands in the third set of authorized bands and fall within the radio frequency capabilities of the base station after the aggregation; if the first spectrum set can aggregate the bandwidth requirement and fall within the radio frequency capabilities of the base station after the aggregation, determine the spectrum allocation scheme as: allocating the unauthorized bands in the first spectrum set as unauthorized bands available to the base station, and aggregating the bandwidth requirement on authorized bands in the third set of authorized bands to the unauthorized bands in the first spectrum set; and a second processing unit 705, configured to: if the first spectrum set falls within the radio frequency capabilities of the base station, determine the spectrum allocation scheme as: allocating the unauthorized bands in the first spectrum set as unauthorized bands available to the base station; or if the first spectrum set falls within the radio frequency capabilities of the base station, determine whether the first set of authorized bands and the second set of authorized bands include a fourth set of authorized bands that can be aggregated with the unauthorized bands in the first spectrum set; and if yes, determine the spectrum allocation scheme as: allocating the unauthorized bands in the first spectrum set as unauthorized bands available to the base station, and aggregating the bandwidth requirement on authorized bands in the fourth set of authorized bands to the unauthorized bands in the first spectrum set.

In the embodiment of the present invention, after the receiver 601 of the central control unit receives a bandwidth request message sent by the base station, the scheme formulating unit 602 creates a spectrum allocation scheme, and specifically, the first determining unit 701 determines whether the set of unauthorized bands that are currently idle can satisfy the bandwidth requirement on the unauthorized bands of the base station; the first obtaining unit 702 obtains, from the set of unauthorized bands that are currently idle, the first spectrum set satisfying the bandwidth requirement on unauthorized bands of the base station if the set of unauthorized bands that are currently idle can satisfy the bandwidth requirement on the unauthorized bands of the base station; then, the second determining unit 703 determines whether the obtained first spectrum set falls within the radio frequency capabilities of the base station; if the first spectrum set goes beyond the radio frequency capabilities of the base station, the first processing unit 704 determines whether the first set of authorized bands includes a third set of authorized bands sharing radio frequency capabilities with the unauthorized bands in the first spectrum set, and if the third set of authorized bands is included, determines whether the first spectrum set can aggregate the bandwidth requirement on authorized bands in the third set of authorized bands and fall within the radio frequency capabilities of the base station after the aggregation, and if the first spectrum set can aggregate the bandwidth requirement and fall within the radio frequency capabilities of the base station after the aggregation, determines the spectrum allocation scheme as: allocating the unauthorized bands in the first spectrum set as unauthorized bands available to the base station, and aggregating the bandwidth requirement on authorized bands in the third set of authorized bands to the unauthorized bands in the first spectrum set; if the first spectrum set falls within the radio frequency capabilities of the base station, the second processing unit 705 determines the spectrum allocation scheme as: allocating the unauthorized bands in the first spectrum set as unauthorized bands available to the base station; or, determines whether the first set of authorized bands and the second set of authorized bands include a fourth set of authorized bands that can be aggregated with the unauthorized bands in the first spectrum set, and if yes, determines the spectrum allocation scheme as: allocating the unauthorized bands in the first spectrum set as unauthorized bands available to the base station, and aggregating the bandwidth requirement on authorized bands in the fourth set of authorized bands to the unauthorized bands in the first spectrum set.

In the embodiment of the present invention, when creating a spectrum allocation scheme, the central control unit creates the spectrum allocation scheme according to the radio frequency capabilities of the base station, the bandwidth requirement on the unauthorized bands of the base station, the set of authorized bands of the base station, and the set of unauthorized bands that are currently idle, so that the obtained spectrum allocation scheme is fit for the radio frequency capabilities of the base station; and by aggregating the bandwidth requirement on the authorized band to the unauthorized band, the number of radio frequency chains is reduced, and resources are saved.

Figure 8:
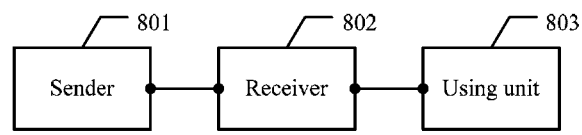
FIG. 8 is a schematic diagram of a base station according to an embodiment of the present invention.

Referring to FIG. 8, a base station is provided according to an embodiment of the present invention, including:

a sender 801, configured to send a bandwidth request message to a central control unit, where the bandwidth request message includes radio frequency capabilities of the base station, a bandwidth requirement on unauthorized bands of the base station, and a set of authorized bands of the base station, where the set of authorized bands of the base station includes at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station;

a receiver 802, configured to receive a bandwidth request response message which includes a spectrum allocation scheme and is fed back by the central control unit, where the spectrum allocation scheme is used to indicate information of an unauthorized band allocated to the base station, and indicate the need of aggregating a bandwidth requirement on at least one authorized band in the set of authorized bands of the base station to the unauthorized band allocated to the base station; and a using unit 803, configured to use the unauthorized band allocated to the base station and deal with the bandwidth requirement on at least one authorized band according to the spectrum allocation scheme, where the using unit 803 may be a processor.

In the embodiment of the present invention, the sender 801 on the base station sends a bandwidth request message to the central control unit, the receiver 802 receives a bandwidth request response message fed back by the central control unit, and the using unit 803 of the base station uses bands according to the spectrum allocation scheme included in the bandwidth request response message.

In the embodiment of the present invention, the bandwidth request message sent by the base station carries radio frequency capabilities of the base station, a bandwidth requirement on an unauthorized band of the base station, and a set of authorized bands of the base station, so that according to the bandwidth request message, the central control unit creates a spectrum allocation scheme that is fit for the radio frequency capabilities of the base station, thereby reducing the probability of failure of the spectrum allocation scheme; in addition, the bandwidth requirement on the authorized band may be aggregated to the unauthorized band, to reduce the number of radio frequency chains required and save resources.

Figure 9:
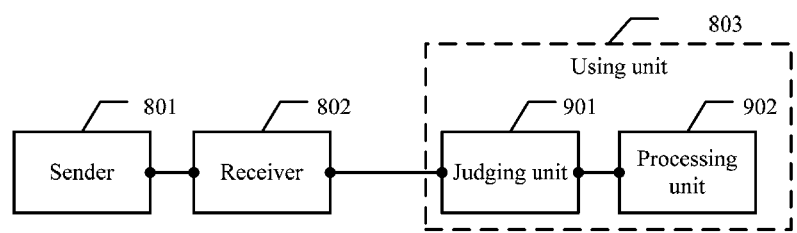
FIG. 9 is another schematic diagram of a base station according to an embodiment of the present invention.

For better understanding of the base station shown in FIG. 8, referring to FIG. 9, a base station is provided according to an embodiment of the present invention, including:

the sender 801, the receiver 802, and the using unit 803 which are shown in FIG. 8, where the units are the same as those described in the embodiment shown in FIG. 8 and are not repeated here any further.

The using unit 803 includes:

a determining unit 901, configured to determine whether the spectrum allocation scheme needs to aggregate the bandwidth requirement on the at least one authorized band to the unauthorized band allocated to the base station; and a processing unit 902, configured to: if it needs to aggregate the bandwidth requirement on the at least one authorized band to the authorized band allocated to the base station, release the at least one authorized band, and switch a terminal service or a terminal in a connected state on the at least one authorized band over to the aggregated unauthorized band.

In the embodiment of the present invention, after the sender 801 of the base station sends a bandwidth request message, the receiver 802 receives a bandwidth request response message which includes a spectrum allocation scheme and is fed back by the central control unit; the determining unit 901 determines whether the spectrum allocation scheme needs to aggregate the bandwidth requirement on the at least one authorized band to the unauthorized band allocated to the base station; if it needs to aggregate the bandwidth requirement on at least one authorized band to the authorized band allocated to the base station, the processing unit 902 releases the at least one authorized band, and switches a terminal service or a terminal in a connected state on the at least one authorized band over to the aggregated unauthorized band; otherwise, the unauthorized band allocated to the base station is used according to the spectrum allocation scheme.

In the embodiment of the present invention, the bandwidth request message sent by the base station carries radio frequency capabilities of the base station, a bandwidth requirement on an unauthorized band of the base station, and a set of authorized bands of the base station, so that according to the bandwidth request message, the central control unit creates a spectrum allocation scheme that is fit for the radio frequency capabilities of the base station, thereby reducing the probability of failure of the spectrum allocation scheme; in addition, the bandwidth requirement on the authorized band may be aggregated to the unauthorized band, to reduce the number of radio frequency chains required and save resources.

Figure 10:
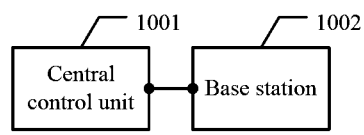
FIG. 10 is a schematic diagram of a spectrum allocation system according to an embodiment of the present invention.

Referring to FIG. 10, a spectrum allocation system is provided according to an embodiment of the present invention, including:

the central control unit 1001 described in the embodiment shown in FIG. 6 or FIG. 7, and the base station 1002 described in the embodiment shown in FIG. 8 or FIG. 9.

Persons of ordinary skill in the art should understand that all or a part of the steps of the method in the embodiments may be implemented by a computer program instructing relevant hardware. The program may be stored in a computer readable storage medium such as a read-only memory, a disk, an optical disk, or the like.

A dynamic spectrum allocation method, a central control unit, a base station, and a spectrum allocation system are described in detail above according to the embodiments of the present invention. Persons of ordinary skill in the art can make modifications in terms of the specific implementation manner and the application scope according to the ideas of the embodiments of the present invention, and the content of the specification shall not be construed as a limitation on the present invention.

What is claimed is:

1. A dynamic spectrum allocation method, comprising:
receiving a bandwidth request message sent by a base station, wherein the bandwidth request message includes radio frequency capabilities of the base station, a bandwidth requirement on unauthorized bands of the base station, and a set of authorized bands of the base station, wherein the set of authorized bands of the base station comprises at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station;
determining a spectrum allocation scheme according to the radio frequency capabilities of the base station, the bandwidth requirement on the unauthorized bands of the base station, the set of authorized bands of the base station, and an obtained set of unauthorized bands that are currently idle; and sending a bandwidth request response message including the spectrum allocation scheme, wherein the spectrum allocation scheme is used to indicate information of an unauthorized band allocated to the base station, and indicate need of aggregating a bandwidth requirement on at least one authorized band in the set of authorized bands of the base station to the unauthorized band allocated to the base station.

2. The method according to claim 1, wherein:

the determining a spectrum allocation scheme according to the radio frequency capabilities of the base station, the bandwidth requirement on the unauthorized bands of the base station, the set of authorized bands of the base station, and an obtained set of unauthorized bands that are currently idle comprises:

determining whether the set of unauthorized bands that are currently idle can satisfy the bandwidth requirement on the unauthorized bands of the base station;

if yes, obtaining, from the set of unauthorized bands that are currently idle, a first spectrum set satisfying the bandwidth requirement on the unauthorized bands of the base station;

determining whether the first spectrum set falls within the radio frequency capabilities of the base station; and if the first spectrum set falls within the radio frequency capabilities of the base station, determining the spectrum allocation scheme as: allocating unauthorized bands in the first spectrum set as unauthorized bands available to the base station.

3. The method according to claim 2, further comprising:

if the first spectrum set goes beyond the radio frequency capabilities of the base station, determining whether the first set of authorized bands comprises a third set of authorized bands sharing radio frequency capabilities with the unauthorized bands in the first spectrum set; and if yes, determining whether the first spectrum set can aggregate a bandwidth requirement on authorized bands in the third set of authorized bands and fall within the radio frequency capabilities of the base station after the aggregation, and if the first spectrum set can aggregate the bandwidth requirement and fall within the radio frequency capabilities of the base station after the aggregation, determining the spectrum allocation scheme as: allocating the unauthorized bands in the first spectrum set as unauthorized bands available to the base station, and aggregating the bandwidth requirement on authorized bands in the third set of authorized bands to the unauthorized bands in the first spectrum set.

4. The method according to claim 2, further comprising:

if the first spectrum set falls within the radio frequency capabilities of the base station, determining whether the first set of authorized bands and the second set of authorized bands comprise a fourth set of authorized bands that can be aggregated with unauthorized bands in the first spectrum set; and if yes, determining the spectrum allocation scheme as: allocating the unauthorized bands in the first spectrum set as unauthorized bands available to the base station, and aggregating a bandwidth requirement on authorized bands in the fourth set of authorized bands to the unauthorized bands allocated to the base station.

5. A dynamic spectrum allocation method, comprising:

sending a bandwidth request message to a central control unit, wherein the bandwidth request message includes radio frequency capabilities of the base station, a bandwidth requirement on unauthorized bands of the base station, and a set of authorized bands of the base station, wherein the set of authorized bands of the base station comprises at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station;

receiving a bandwidth request response message which includes a spectrum allocation scheme and is fed back by the central control unit, wherein the spectrum allocation scheme is used to indicate information of an unauthorized band allocated to the base station, and indicate need of aggregating a bandwidth requirement on at least one authorized band in the set of authorized bands of the base station to the unauthorized band allocated to the base station; and using the unauthorized band allocated to the base station and dealing with the bandwidth requirement on at least one authorized band according to the spectrum allocation scheme.

6. The method according to claim 5, wherein:

the using the unauthorized band allocated to the base station and dealing with the bandwidth requirement on at least one authorized band according to the spectrum allocation scheme comprises:

determining whether the spectrum allocation scheme needs to aggregate the bandwidth requirement on the at least one authorized band to the unauthorized band allocated to the base station; and if yes, using the unauthorized band allocated to the base station, releasing the at least one authorized band, and switching a terminal service or a terminal in a connected state on the at least one authorized band over to the unauthorized band allocated to the base station.

7. A central control unit, comprising:

a receiver, configured to receive a bandwidth request message sent by a base station, wherein the bandwidth request message includes radio frequency capabilities of the base station, a bandwidth requirement on unauthorized bands of the base station, and a set of authorized bands of the base station, wherein the set of authorized bands of the base station comprises at least one of the following: a set for a first authorized band that share radio frequency capabilities with the unauthorized bands and are aggregated and dynamically available on the base station, and a set for a second authorized band that share no radio frequency capability with the unauthorized bands and are aggregated and dynamically available on the base station;

a scheme formulating unit, configured to determine a spectrum allocation scheme according to the radio frequency capabilities of the base station, the bandwidth requirement on the unauthorized bands of the base station, the set of authorized bands of the base station, and an obtained set of unauthorized bands that are currently idle; and a sender, configured to send a bandwidth request response message including the spectrum allocation scheme, wherein the spectrum allocation scheme is used to indicate information of an unauthorized band allocated to the base station, and indicate need of aggregating a bandwidth requirement on at least one authorized band in the set of authorized bands of the base station to the unauthorized band allocated to the base station.

8. The central control unit according to claim 7, wherein the scheme formulating unit comprises:
- a first determining unit, configured to determine whether the set of unauthorized bands that are currently idle can satisfy the bandwidth requirement on the unauthorized bands of the base station;
- a first obtaining unit, configured to obtain, from the set of unauthorized bands that are currently idle, a first spectrum set satisfying the bandwidth requirement on the unauthorized bands of the base station if the set of unauthorized bands that are currently idle can satisfy the bandwidth requirement on the unauthorized bands of the base station;
- a second determining unit, configured to determine whether the first spectrum set falls within the radio frequency capabilities of the base station;
- a first processing unit, configured to: if the first spectrum set goes beyond the radio frequency capabilities of the base station, determine whether the first set of authorized bands comprises a third set of authorized bands sharing radio frequency capabilities with unauthorized bands in the first spectrum set; if yes, determine whether the first spectrum set can aggregate a bandwidth requirement on authorized bands in the third set of authorized bands and fall within the radio frequency capabilities of the base station after the aggregation; if the first spectrum set can aggregate the bandwidth requirement and fall within the radio frequency capabilities of the base station after the aggregation, determine the spectrum allocation scheme as: allocating the unauthorized bands in the first spectrum set as unauthorized bands available to the base station, and aggregating the bandwidth requirement on authorized bands in the third set of authorized bands to the unauthorized bands in the first spectrum set; and
- a second processing unit, configured to: if the first spectrum set falls within the radio frequency capabilities of the base station, determine the spectrum allocation scheme as: allocating the unauthorized bands in the first spectrum set as unauthorized bands available to the base station; or, if the first spectrum set falls within the radio frequency capabilities of the base station, determine whether the first set of authorized bands and the second set of authorized bands comprise a fourth set of authorized bands that can be aggregated with the unauthorized bands in the first spectrum set; and if yes, determine the spectrum allocation scheme as: allocating the unauthorized bands in the first spectrum set as unauthorized bands available to the base station, and aggregating a bandwidth requirement on authorized bands in the fourth set of authorized bands to the unauthorized bands in the first spectrum set.

* * * * *